United States Patent
Allen

(10) Patent No.: US 7,836,593 B2
(45) Date of Patent: Nov. 23, 2010

(54) COLD SPRAY METHOD FOR PRODUCING GAS TURBINE BLADE TIP

(75) Inventor: David B. Allen, Oviedo, FL (US)

(73) Assignee: Siemens Energy, Inc., Orlando, FL (US)

(*) Notice: Subject to any disclaimer, the term of this patent is extended or adjusted under 35 U.S.C. 154(b) by 1456 days.

(21) Appl. No.: 11/208,296

(22) Filed: Aug. 19, 2005

(65) Prior Publication Data

US 2007/0248750 A1 Oct. 25, 2007

Related U.S. Application Data

(63) Continuation-in-part of application No. 11/082,414, filed on Mar. 17, 2005.

(51) Int. Cl.
*B23P 15/02* (2006.01)

(52) U.S. Cl. .......... 29/889.1; 29/889.7; 29/889.71; 29/889.72; 228/119; 277/412; 277/415; 427/142; 427/191; 427/404; 427/180; 427/202; 427/421.1

(58) Field of Classification Search .... 29/888–888.025, 29/889–889.1; 416/92, 193 A; 277/412, 277/415; 415/173.4; 228/119, 122.1; 427/404, 427/191, 412, 142, 180, 202, 421.1
See application file for complete search history.

(56) References Cited

U.S. PATENT DOCUMENTS

| | | | |
|---|---|---|---|
| 5,022,818 A | 6/1991 | Scalzo | |
| 5,048,183 A * | 9/1991 | Cang et al. | 29/889.1 |
| 5,076,897 A | 12/1991 | Wride et al. | |
| 5,302,414 A | 4/1994 | Alkhimov et al. | |
| 5,314,304 A * | 5/1994 | Wiebe | 415/173.4 |
| 5,660,320 A * | 8/1997 | Hoffmuller et al. | 228/122.1 |
| 5,702,574 A | 12/1997 | Foster et al. | |
| 5,785,492 A | 7/1998 | Belsom et al. | |
| 5,788,456 A | 8/1998 | Maier | |
| 6,039,535 A | 3/2000 | Kobayashi et al. | |
| 6,089,828 A | 7/2000 | Hollis et al. | |
| 6,358,002 B1 | 3/2002 | Good et al. | |
| 6,365,222 B1 | 4/2002 | Wagner et al. | |
| 6,444,259 B1 | 9/2002 | Subramanian et al. | |
| 6,464,453 B2 | 10/2002 | Toborg et al. | |
| 6,481,959 B1 | 11/2002 | Morris et al. | |
| 6,491,208 B2 | 12/2002 | James et al. | |
| 6,558,114 B1 | 5/2003 | Tapley et al. | |
| 6,706,319 B2 | 3/2004 | Seth et al. | |
| 6,751,863 B2 | 6/2004 | Tefft | |
| 6,752,589 B2 | 6/2004 | Vogan et al. | |
| 6,780,458 B2 | 8/2004 | Seth et al. | |
| 6,905,728 B1 * | 6/2005 | Hu et al. | 427/142 |

* cited by examiner

*Primary Examiner*—Rick K Chang

(57) ABSTRACT

A quantity of particles (28) may be cold-sprayed toward the distal surface (22) of a turbine blade (6) at a temperature below a melting point of the particles at a velocity sufficiently high to cause at least a portion of the particles to adhere to the surface to form squealer ridge (24) with a desired cutting profile. The cutting profile may be defined by a face (52) and a land (54) disposed at a relief angle (38) relative to a direction of motion (58) of a cutting edge (48). The ridge may be built by multiple passes of a cold spray gun depositing sequential layers (30, 32, 34) of varying widths. An in-service blade having worn distal surface may be repaired using this technique.

18 Claims, 3 Drawing Sheets

COLD SPRAY METHOD FOR PRODUCING GAS TURBINE BLADE TIP

This application is a continuation-in-part of co-pending U.S. application Ser. No. 11/082,414 filed 17 Mar. 2005.

FIELD OF THE INVENTION

This invention relates generally to the field of materials technologies, and more specifically to the field of fitting a gas turbine blade assembly with a seal between the blades and a surrounding shroud by applying material to the distal surfaces of the blades using a cold spray technique.

BACKGROUND OF THE INVENTION

The turbine blades of Model W501 F/G engines manufactured by the assignee of the present invention have narrow squealer ridges that extend from the blade tips as shown schematically in FIGS. 2 and 3. A shroud ring surrounding the blades has an inner surface coated with a ceramic abradable material. The squealer ridges rub against the abradable material under some engine conditions, causing the ridges to lose length. This degrades engine performance because it increases the gap between the ridge and shroud, thus increasing gas leakage around the blade tip and resulting in loss of power and efficiency. Also, rubbing can damage the blade tips, causing cracks, and sometimes causing closure of blade tip cooling air holes.

An attempt was made to decrease blade tip wear by electroplating cBN (cubic boron nitride) abrasive particles on the blade tip. However, cBN grits are destroyed by high temperatures in the turbine section after only a few hours of engine operation. The thermal expansion behavior of these engines is such that the minimum blade tip-to-shroud gap occurs during a warm restart. If this mode of operation occurs after loss of the cBN grits, the bare metal squealer ridges may contact the ceramic abradable coating, causing the ridges to lose length.

A review of current literature on cutting abradable coatings shows that machining a relief angle on a cutting tool increases its efficiency by allowing dislodged particles to escape, thereby avoiding unnecessary friction between these particles and the workpiece. A relief angle occurs where the land, or the surface following the cutting edge, diverges from the workpiece. Unfortunately, machining a relief angle on squealer ridges is an expensive addition for new blades. Used blades are already too short due to the abrasive rubbing, so machining a relief angle on used blades is not feasible.

DETAILED DESCRIPTION OF THE INVENTION

Figure 1:
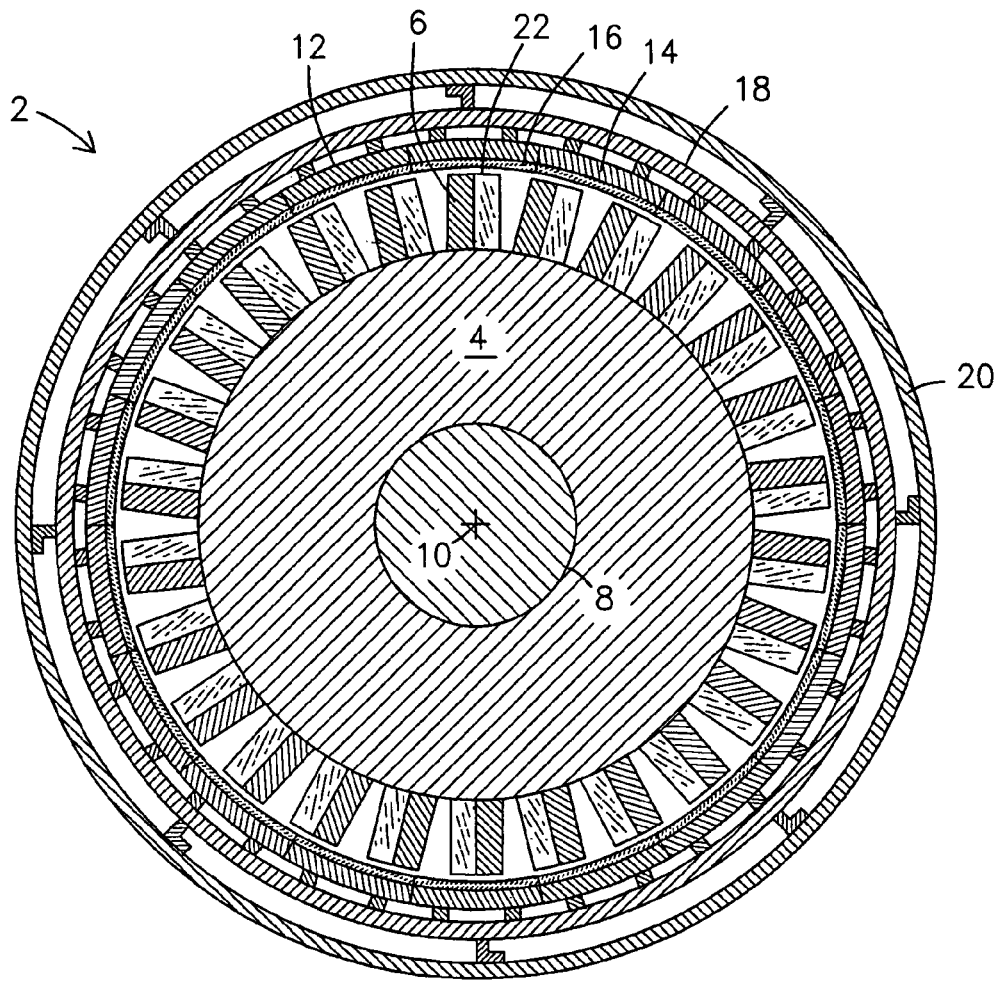
FIG. 1. is a schematic sectional view of a gas turbine disk taken on a plane normal to the engine shaft axis.
Figure 2:
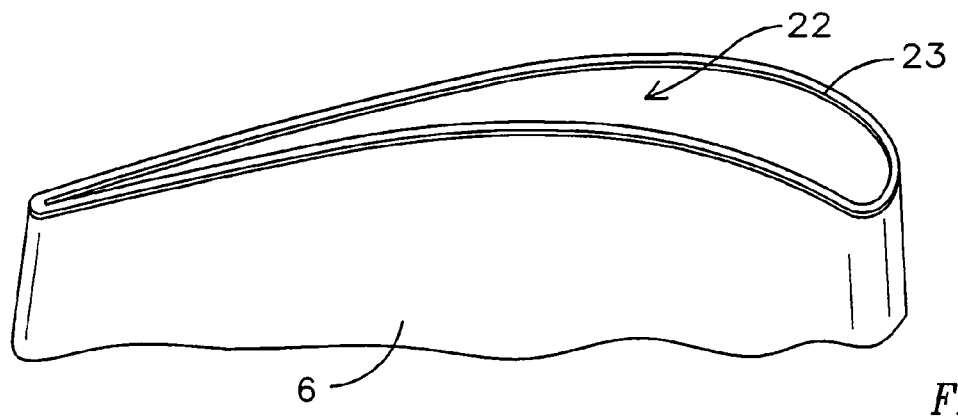
FIG. 2 is a perspective prior art view of a turbine blade tip.
Figure 3:
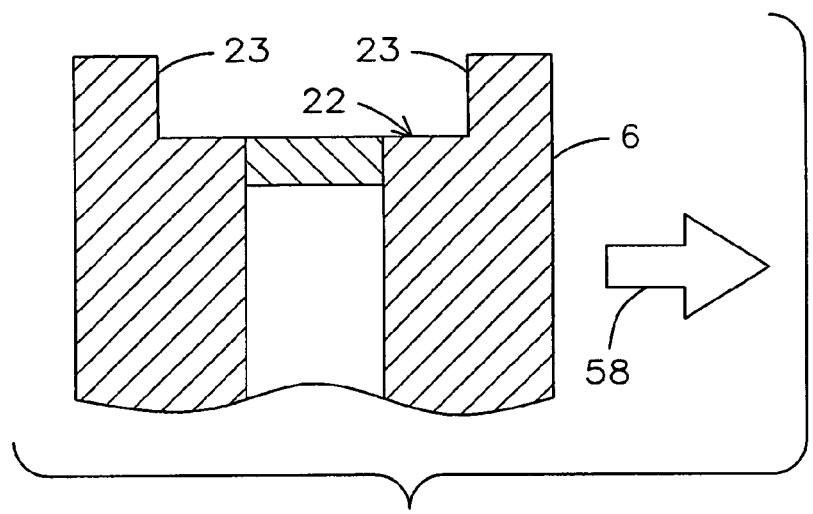
FIG. 3 is a sectional prior art view of a turbine blade tip.

FIG. 1 is a schematic sectional view of a turbine section 2 of a gas turbine engine, illustrating a turbine disk 4 with radiating blades 6 mounted on a rotating shaft 8 with an axis 10. The blades 6 are surrounded by a refractory shroud ring 12 comprising ring segments 14 with an inner surface of abradable material 16. The ring segments 14 are mounted on a surrounding structure 18 in a case 20. Each blade 6 has a distal surface 22 adjacent to the inner surface 16 of the shroud ring. FIGS. 2 and 3 show a prior art squealer ridge 23 on the distal surface 22 of a turbine blade 6.

A method is disclosed for forming improved squealer ridges 24 of high hardness and optimum profiles to create more efficient interstage sealing within the turbine section 2. The method is applicable to both new and used blades, and can be applied in the field. Worn squealer ridges of a prior type 23 or a present type 24 can be repaired, replaced, or upgraded by this method in the factory or in the field.

Figure 5:
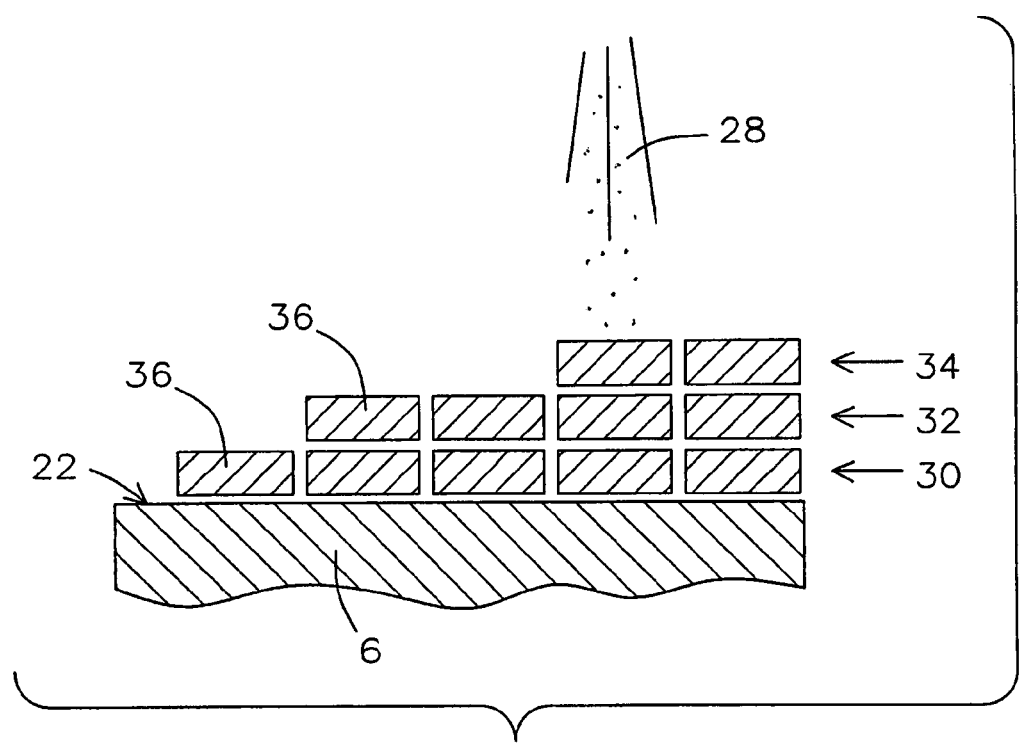
FIG. 5 is a sectional view of formation of a squealer ridge profile by layering material in multiple cold spraying passes.

One aspect of the invention provides a process for applying a cold spray of particles 28 toward a distal surface 22 of a turbine blade 6 at a velocity sufficiently high to cause at least some of the particles to adhere to the surface 22 to form a squealer ridge 24. The particles 28 may include a material harder than that of the blade 6. In a cold spraying process, the particles 28 are applied at a temperature below a softening temperature of the particles 28. As shown in FIG. 5, the particles 28 may be applied in successive layers 30, 32, 34 that build a desired sectional profile for a squealer ridge 24 suitable for a cutting tool. The process may create a ridge 24 with a generally quadrilateral sectional profile comprising a base 50, a face 52, a land 54, a following surface 56, a cutting edge 48 at the intersection of the face 52 and land 54, a direction of motion 58, and a relief angle 38. The face 52 may be perpendicular to the direction of motion 58 (i.e. a zero rake angle) or it may have a small rake angle.

An embodiment of the method allows for an abradable material 16 to be deposited on the shroud ring segments 14 using a conventional thermal spray technique, or by attaching a monolithic abradable element to the shroud ring segment 14, or by a cold spray technique such as described in U.S. Pat. No. 6,365,222. Aspects of the invention allow for the abradable material 16 to be applied to the inner surface of a shroud ring segment 14. The abradable material 16 may be any such material known in the art. For example it may comprise about 75% nickel and about 25% graphite, with the nickel being clad over graphite flakes. Alternate embodiments allow for these percentages to vary, and other types of abradable material 16 may be used depending on the application. For example, a porous 8YSZ layer may be used in gas turbine applications.

FIGS. 2 and 3 illustrate a prior art arrangement of forming a squealer ridge 23 on the distal surface 22 of a blade 6 for a turbine section 2 of a gas turbine engine as known in the art. Prior art squealer ridges 23 may be formed of a refractory metal superalloy such as CM-247 or IN-738. The ridges 23 rub against the facing inner surface 16 of abradable material on the shroud ring segments 14 during engine operation. This rubbing deforms the squealer ridges 23, eventually degrading the sealing capacity between the blade 6 and the shroud ring 12.

Figure 4:
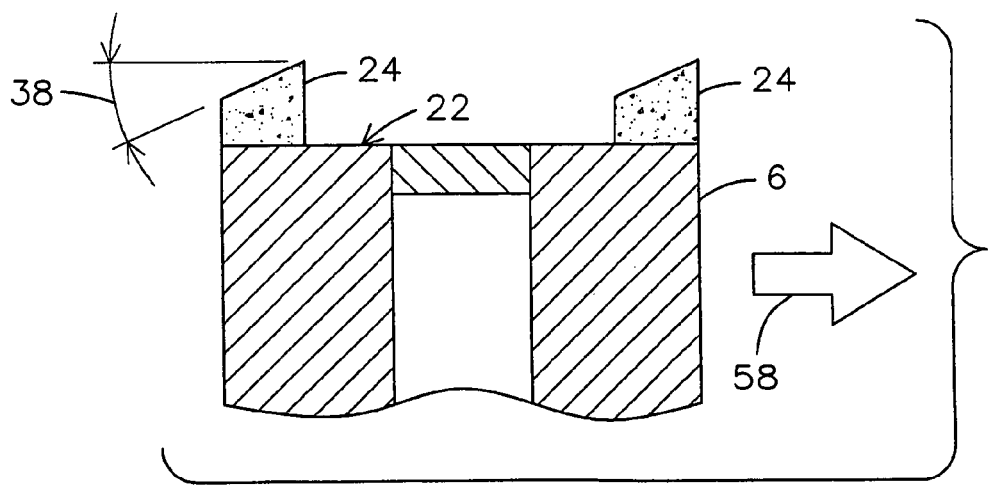
FIG. 4 is a sectional view of squealer ridges with a relief angle.

FIG. 4 illustrates an embodiment of the invention in which squealer ridges 24 are formed with a cross sectional profile that is generally quadrilateral with a relief angle 38 for improved cutting efficiency. A common characteristic of the improved profiles is a generally sharp cutting edge 48 and a relief angle 38. The relief angle may be at least 2 degrees, or in the range of 2 to 10 degrees, or 2 to 6 degrees or 6 to 10 degrees.

Industrial gas turbines engines such as the Models W501F/G, W501D/251 upgrades and V84/94 sold by the assignee of the present invention having a turbine blade tip configuration of FIGS. 2 and 3 have been in use in the field for many years. Consequently, the seal formed between the squealer ridges 23 and the shroud ring segments 14 has degraded in some of these engines due to normal wear. In this respect, the present inventors have determined that a cold spraying process allows for retrofitting turbine blades 6 rather than replacing them. The squealer ridges 24 engage and cut the abradable material 16 during operation of the turbine 2. This minimizes clearance between turbine blades 6 and shroud ring segments 14, which improves overall performance of the gas turbine engine, resulting in significant cost savings. The required thickness of abradable material 16 is a function of the maximum thermal deflection expected in the part of the engine where abradable material 16 is applied. For example, if the clearance between the squealer ridge 24 and the shroud ring segment 14 changes by 1 mm during operation, then approximately 1 mm or greater thickness of abradable material 16 may be applied.

The inventors have determined that a cold spray process may be used to produce geometries such as those shown in FIG. 4, comprising a cutting profile with a relief angle 38. U.S. Pat. No. 5,302,414 dated Apr. 12, 1994, which is incorporated herein by reference, describes a cold gas-dynamic spraying process for applying a coating, also referred to herein as cold spraying or cold spray. That patent describes a process and apparatus for accelerating solid particles having a size from about 1-50 microns to supersonic speeds in the range of 300-1,200 meters per second and directing the particles against a target surface. When the particles strike the target surface, the kinetic energy of the particles causes plastic deformation of the particles and a bond is formed between the particles and the target surface and between the incoming particles and the previously deposited particles. Unlike conventional thermal spray techniques, cold spray relies almost entirely upon the high velocity of the impinging particles to create dense coatings, thus imparting very little heat to the substrate material. This technique allows for turbine blade applications in accordance with the invention since turbine blades 6 are heat treated for high strength and ductility. Any excess heating of the blade distal surface 22 could compromise the desirable material properties.

FIG. 5 shows schematically how successive passes of a cold spray gun may deposit successive layers to form a ridge 24. By way of example, a first layer 30 of cold-sprayed material 28 may be formed by five successive passes of the spray gun around at least a portion of the perimeter of the distal surface 22 of a turbine blade 6 to deposit adjacent rows of particles 28 on the distal surface 22. The relative speed of fixture motion may be controlled simultaneously with the spray gun parameters to achieve a desired shape and/or material properties of each adjacent row 36. Rows 36 are shown as rectangular for illustration purpose. Successive passes of the spray gun may be controlled to form a successive second layer 32 of cold-sprayed material 28 by depositing additional adjacent rows 36 on top of the first layer 30. A successive third layer 34 of cold-sprayed material 28 may be deposited as one or more rows 36 on top of the second layer 32 to form a sharp edge 48 on the ridge 24. The spray gun may be controlled as in FIG. 5 to make successive passes around the perimeter of the distal surface 22 of a turbine blade 6 to deposit adjacent rows 36 of cold-sprayed material and successive layers 30, 32, 34 on top of one another. Controlling the fixture speed allows for controlling the dwell time of the spray gun along portions of the perimeter of the blade distal surface 22 to form a ridge 24. The inventors have determined that controlling the fixture motion in conjunction with the spray gun parameters allows for forming a ridge 24 having a desired geometry and material properties.

The number of passes of the spray gun to deposit adjacent rows per layer 30, 32, 34, and the dwell time of the spray gun at various locations during each pass, and the number of layers 30, 32, 34 deposited, may vary as a function of the desired configuration, dimensions and material properties of the ridge 24. Alternate combinations of passes per layer and number of layers are contemplated by the present invention to achieve a wide range of geometries. Rows of material 28 in a given layer 30, 32, 34 may be adjacent as shown, or may overlap (not shown).

Figure 6:
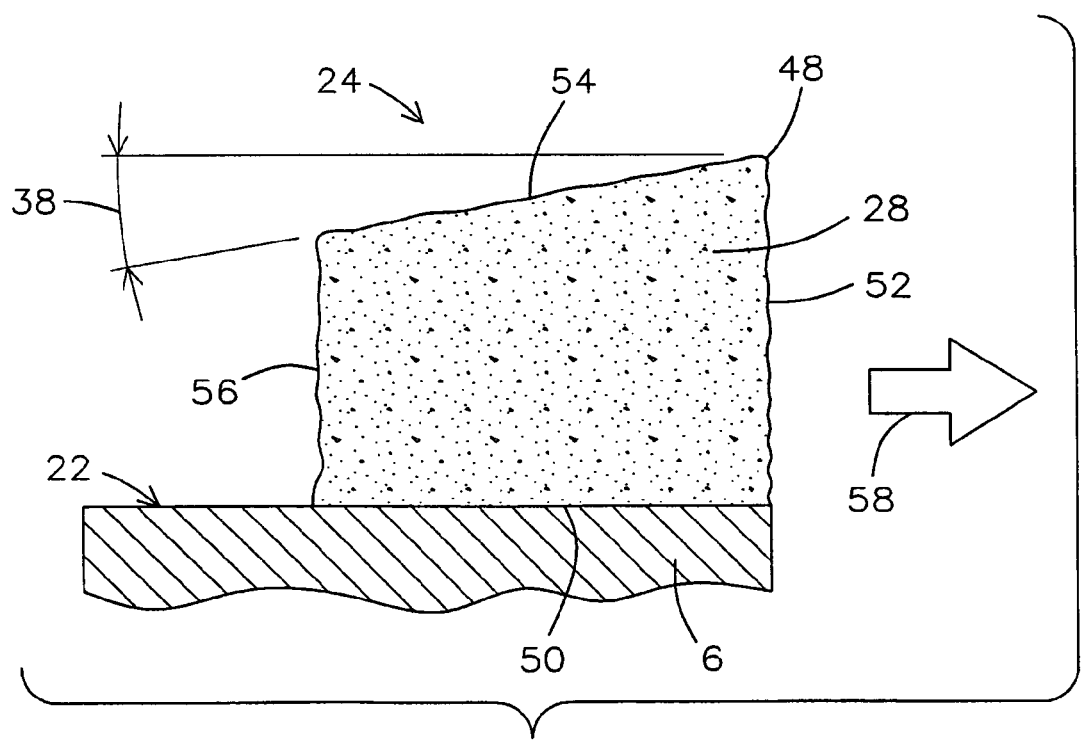
FIG. 6 illustrates an exemplary geometry deposited in accordance with aspects of the invention.

FIG. 6 shows a cross section of an exemplary ridge 24 cold-spray deposited on a distal surface 22 of a turbine blade 6. The cold-sprayed particles 28 may have the same chemical composition as that of the distal surface 22 of the turbine blade 6. This helps to ensure the deposited materials 28 are sufficiently bonded to the substrate. In another embodiment the cold-sprayed particles 28 may include a material harder than that of the blade distal surface 22 to create a very hard ridge 24 surface that will more effectively abrade the abradable material 16 for certain applications. Such an embodiment may be necessary if the engine operates in an environment that contains a large fraction of erodent particles that could erode a softer ridge material. For example, a ceramic/metal composite material, or cermet, may be used, comprising ceramic particles in a matrix of metal. One convenient particulate form of cermet material comprises particles of ceramic coated with metal. When cold-sprayed as described these particles agglomerate to form a cermet coating. The type(s) of particles deposited may remain consistent throughout the depth of the ridge, or the type(s) may vary as a function of the layer number 30, 32, and 34.

Figure 7:
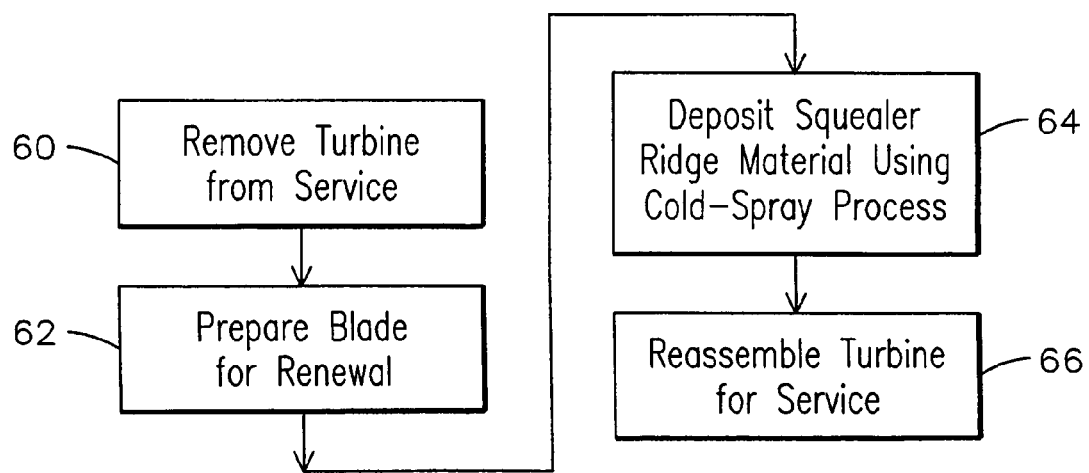
FIG. 7 is a flow diagram of an exemplary method in accordance with aspects of the invention.

FIG. 7 illustrates a method aspect of the invention for retrofitting or repairing turbine blade squealer ridges 24. A gas turbine may be removed from service 60 for routine maintenance or for specifically retrofitting the improved squealer ridges 24. The turbine blades are then prepared 62. The old squealer ridges 24 and any debris or coatings may be removed, as desired or needed, prior to applying 64 new squealer ridges 24, then reassembling the turbine for service 66.

Each blade 6 may be removed from a turbine disk 4 and fixed in a first fixture. A spray gun may be fixed in a second fixture. One or both fixtures may be movable by a programmed logic machine controller as known in the art of robotic spraying. Spray is applied while relative motion between the two fixtures is controlled to deposit adjacent or overlapping bands or rows 36 of a cold-sprayed material to create a layer 30 as shown in FIG. 5. Successive passes may be used to deposit successive layers 32, 34 of cold-sprayed material 28 on top of previously deposited layers of material.

Example 1

In this example, parallel ridges of 316L stainless steel were sprayed onto a flat plate of 4340 steel using a cold-spray technique that produced ridges with triangular cross sections. The spray conditions were varied slightly between ridges, and the efficacy of each spray condition was evaluated by later sectioning and metallography of the sprayed ridges. The spray conditions used for each ridge are listed in Table 1. A commercial 316L stainless steel powder with a sieve size predominantly between 11 and 38 microns was used for all spray trials.

TABLE 1

Cold Spray Conditions[†]

| Ridge | Gun Traverse Rate (meters/minute) | Number of Passes | Measured Particle Velocity (meters/second) |
|---|---|---|---|
| A | 18.7 | 150 | 610-740 |
| B | 9.5 | 100 | 610-740 |

[†]Common spray conditions were as follows:
Nitrogen pressure: 3.25 MPa
Nitrogen temperature: 550° C.
Nitrogen flow rate: 85 cubic meters/hour
Gun nozzle exit diameter: 6.4 mm The gun was translated 150 microns laterally after each subsequent pass to deposit the next pass (i.e., the step size was 150 microns). The ridges that were produced were shown to be fully dense near the centerline, becoming slightly porous near the outside edges. This was due to the central material being "peened" more fully by subsequent passes, whereas the outside material in each ridge had fewer overlapping passes. For example, with respect to ridge "A" above, the central material or peak of the ridge was formed with 150 passes whereas the sides of the ridge were formed with less than 150 passes. The aspect ratio of the ridges formed was approximately 1:1. A higher aspect ratio, such as 2:1 for example, could be achieved by using fewer or shorter lateral steps.

Example 2

In this example, two concentric ridges of 316L stainless steel were sprayed onto a 15 cm diameter disk of 4340 steel using a cold-spray technique that produced triangular cross sections. The spray conditions were varied slightly for each ridge, with the conditions used listed in Table 2. A commercial 316L stainless steel powder with a sieve size predominantly between 11 and 38 microns was used for all spray trials.

TABLE 2

Cold Spray Conditions[†]

| Ridge # | Gun Traverse Rate (meters/minute) | Number of Passes | Measured Particle Velocity (meters/second) |
|---|---|---|---|
| C | 44 | 450 | 580-730 |
| D | 31 | 300 | 580-730 |

[†]Common spray conditions were as follows:
Nitrogen pressure: 3.25 MPa
Nitrogen temperature: 550° C.
Nitrogen flow rate: 85 cubic meters/hour
Gun nozzle exit diameter: 6.4 mm The gun was translated 150 microns laterally after each subsequent pass to deposit the next pass (i.e., the step size was 150 microns). No sectioning or metallography was done on the ridges deposited onto the disk, but the cold-sprayed triangular ridges appeared visibly similar to those applied to the flat plate in Example 1.

The coated disk was then used to evaluate the ability of the cold-sprayed ridges to cut into a representative material such as one used to form abradable material 16. The representative material selected was 75/25 nickel/graphite (a commercially available material comprised of 75 wt % graphite flakes electrolytically coated with 25 wt % nickel). A flame spray technique was used to apply a 3 mm thick nickel/graphite coating onto carbon steel plate material substrates. These coated substrates were then held in the tool holder of a commercial lathe. The disk with the two ridges was chucked into the lathe and spun at 1450 rpm, corresponding to a surface speed of 27,300 inches per minute. The abradable coated plate was fed into the spinning disk at a rate of 0.125 millimeters per second, for a total incursion depth of 2 mm. Two parallel, clean, full depth cuts were produced in the nickel/graphite coating and no wear or visible damage was detected on the cold-sprayed ridges.

Embodiments of the invention may be utilized in a wide range of applications where it is desirable to form a seal between two components moving relative to one another such as in many configurations of industrial gas turbines or other such engines used in aerospace, for example. Other applications will be recognized by those skilled in the art.

While various embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A method comprising:
    directing a quantity of particles toward a distal surface of a blade of a gas turbine engine at a velocity sufficiently high to cause at least a portion of the quantity of particles to adhere to the blade distal surface; and
    controlling the directing step such that the adhered particles form a ridge, the ridge comprising a ribbon of material extending above the blade distal surface, the ridge further comprising a cutting edge with a relief angle of at least 2 degrees.

2. The method of claim 1 further comprising controlling the directing step to form the ridge to comprise a generally quadrilateral sectional profile comprising a base that is in contact with the blade distal surface, a face, a following side, and a land, the face and the land intersecting to form the cutting edge, and the land diverging from a direction of motion of the cutting edge to form the relief angle.

3. The method of claim 2, further comprising controlling the directing step to form the ridge to comprise the relief angle of between 2 and 6 degrees.

4. The method of claim 2, further comprising controlling the directing step to form the ridge to comprise the relief angle of between 6 and 10 degrees.

5. The method of claim 1 wherein the blade distal surface comprises a first material, and at least a portion of the particles comprise a second material that is harder than the first material.

6. The method of claim 1 wherein at least a portion of the particles comprise ceramic particles and metal particles that are adhered together to form a ceramic/metal matrix material.

7. The method of claim 1 further comprising:
    removing the blade from the engine prior to the step of directing; and
    removing material from at least a portion of the blade distal surface prior to the step of directing.

8. The method of claim 1, wherein the directing step comprises:
    directing a first series of substantially parallel bands of the particles onto a portion of the blade distal surface to form a first layer; and
    directing additional substantially parallel bands of the particles to form a sequential plurality of additional layers over the first layer, a number of bands for each layer being controlled to form the cutting edge and the relief angle.

9. The method of claim 8, wherein particles forming the first layer comprise a material different than particles of at least one of the additional layers.

10. A method comprising:
depositing an abradable material layer on an inner surface of a turbine shroud ring segment of a gas turbine engine;
cold spraying a quantity of particles toward a distal surface of a blade of the gas turbine engine at a velocity sufficiently high to cause at least a portion of the particles to adhere to a portion of the blade distal surface in a first series of substantially parallel bands to form a first layer;
sequentially cold spraying a plurality of additional layers of particles, each additional layer being deposited onto the sequentially previous layer, each additional layer having fewer bands than the previous layer such that an angled land surface is created forming a ridge with a sectional profile comprising a cutting edge and a relief angle of at least 2 degrees relative to a direction of motion of the blade during operation of the gas turbine engine; and
whereby the ridge can cut the abradable material layer during operation of the gas turbine engine to form an interstage seal.

11. The method of claim 10, wherein the blade distal surface comprises a first material, and at least a portion of the particles comprises a second material that is harder than the first material.

12. The method of claim 10, wherein particles forming the first layer comprise a material different than particles of at least one of the additional layers.

13. The method of claim 10, wherein the particles comprise both a ceramic and a metal that are deposited together to form a ceramic/metal matrix material in each of the cold-spraying steps.

14. The method of claim 10, further comprising:
controlling the cold-spraying to form the profile generally as a quadrilateral comprising a base that is in contact with the blade distal surface, a face, a following surface, and a land, the face and the land having a common endpoint defining the cutting edge, and the land diverging from a direction of motion of the cutting edge by the relief angle.

15. The method of claim 14, wherein the relief angle is between 2 and 6 degrees.

16. The method of claim 14, wherein the relief angle is between 6 and 10 degrees.

17. A method comprising:
removing a blade from service in a gas turbine engine, the blade comprising a worn squealer tip;
directing a quantify of solid particles toward the worn squealer tip at a velocity sufficiently high to cause at least a portion of the particles to deform and to adhere to the blade tip; and
controlling the step of directing to form a renewed squealer tip comprising a face intersecting with a land to define a cutting edge, the land diverging from the cutting edge at a relief angle of at least 2 degrees relative to a direction of motion of the squealer tip.

18. The method of claim 17, further comprising selecting the particles to comprise a material exhibiting a hardness value greater than a hardness value of a material of the worn blade tip.

* * * * *